United States Patent [19]

Egger

[11] Patent Number: 4,668,981
[45] Date of Patent: May 26, 1987

[54] NUCLEAR REACTOR VISUAL INSPECTION SYSTEM

[75] Inventor: Eugene R. Egger, Baldwinsville, N.Y.

[73] Assignee: C.T.S. Power Services, Inc., Liverpool, N.Y.

[21] Appl. No.: 512,271

[22] Filed: Jul. 11, 1983

[51] Int. Cl.⁴ .............................................. H04N 7/18
[52] U.S. Cl. .................................. 358/100; 358/108; 376/248; 376/249
[58] Field of Search ............... 358/100, 104, 108, 229; 376/248, 249

[56] References Cited

U.S. PATENT DOCUMENTS 3,757,042  9/1973  Funk ..................................... 358/229
4,429,329  1/1984  Clemens ............................... 358/100

Primary Examiner—Howard W. Britton
Attorney, Agent, or Firm—Charles S. McGuire

[57] ABSTRACT

A system for performing visual inspection through a television camera and monitor of submerged portions of nuclear reactors such as those used in electrical generating plants. A conventional camera and one or more lamps are mounted upon central portions of a positioning device. A pair of arms extend outwardly from opposite sides of the central portion, perpendicular to the camera axis, and a third arm extends to a terminal end above the central portion on a line preferably intersecting the center of gravity of the assembly and perpendicular to the camera axis. The positioning device, carrying the camera and lamp, is lowered into the reactor cavity by a line attached to the terminal end of the third arm, such line preferably comprising the electrical cable for the lamp and/or camera. A flexible line is attached to the end of each of the outwardly extending pair of arms. The inspection is performed by three individuals, two of whom stand at spaced locations on a platform or walk-way above the reactor cavity, one holding the line attached to the third arm and the other two lines attached to the pair of outwardly extending arms. The vertical position and rotational orientation of the positioning device are controlled by the individuals holding the corresponding lines as the third individual views the television monitor, directs the other two in manipulation of the positioning device and operates any necessary controls such as lamp intensity.

18 Claims, 3 Drawing Figures

NUCLEAR REACTOR VISUAL INSPECTION SYSTEM

BACKGROUND OF THE INVENTION

The present invention relates to visual inspection of water-immersed portions of existing nuclear reactor vessels and, more particularly, to an inspection system involving manual manipulation of a television camera through which the reactor components are viewed.

Periodic inspections of nuclear reactor vessels are required for obvious safety reasons in connection with their operation. Among the portions which must be inspected to detect any scratches, cracks, fissures or other possible sources of leaks are components which are at all times completely immersed in water during both operation and inspection. Such components include feed water spargers, core spargers and supply piping therefor, and welded attachments, as well as the internal stainless steel cladding of the reactor vessel.

The most convenient and effective means for performing such inspections is normally to scan the areas under inspection with a television camera which transmits a video signal to a monitor displaying the area for visual determination of its condition. Although a number of systems have been provided for carrying out inspections in this manner, they normally involve quite elaborate and expensive equipment for mounting a camera within the reactor vessel and moving it in the desired manner to scan the areas to be inspected. Furthermore, the inspection system itself involves the installation of equipment which may require periodic adjustment or repair at inconvenient locations within the reactor vessel.

Accordingly, it is a primary object of the present invention to provide a simplified and economical system for visually inspecting water-immersed areas within nuclear reactor vessels.

Another object is to provide a method, and apparatus useful in the implementation thereof, for performing visual inspections, through a television camera and monitor, of internal areas of reactor vessels which is both efficient and effective.

A further object is to provide an inspection system for nuclear reactor vessels which involves no apparatus permanently mounted within the vessel.

Still another object is to provide a novel and improved positioning device, and means for selective manipulation thereof, for a television camera and associated lighting equipment for use in visual inspection of nuclear reactor vessels.

SUMMARY OF THE INVENTION

In accordance with the foregoing objects, the invention contemplates a system wherein a television camera is suspended within a reactor vessel from a first, hand-held line by an individual positioned on a platform above the open top of the vessel. The camera is carried on a positioning device which includes a pair of arms extending outwardly to terminal ends on opposite sides of the camera axis. Lines attached to each of these arms are held by a second individual, also positioned on the platform, preferably at some distance from the first-mentioned individual.

In this manner, the vertical position of the camera is controlled by the amount of line payed out by the first individual and the rotational orientation is controlled by the two lines held by the second individual. The horizontal position of the camera may be directly beneath the first individual's position on the platform, or may be displaced therefrom by the second individual pulling in both of the other two lines to the desired extent. In any case, a third individual is positioned at a television monitor to view the image relayed by the camera and direct the other two individuals in its deployment. Also, the positioning device carries illumination means, the intensity of which may be selectively varied by the third individual while viewing the monitor to inspect the areas of the vessel scanned by the camera.

DETAILED DESCRIPTION

Figure 1:
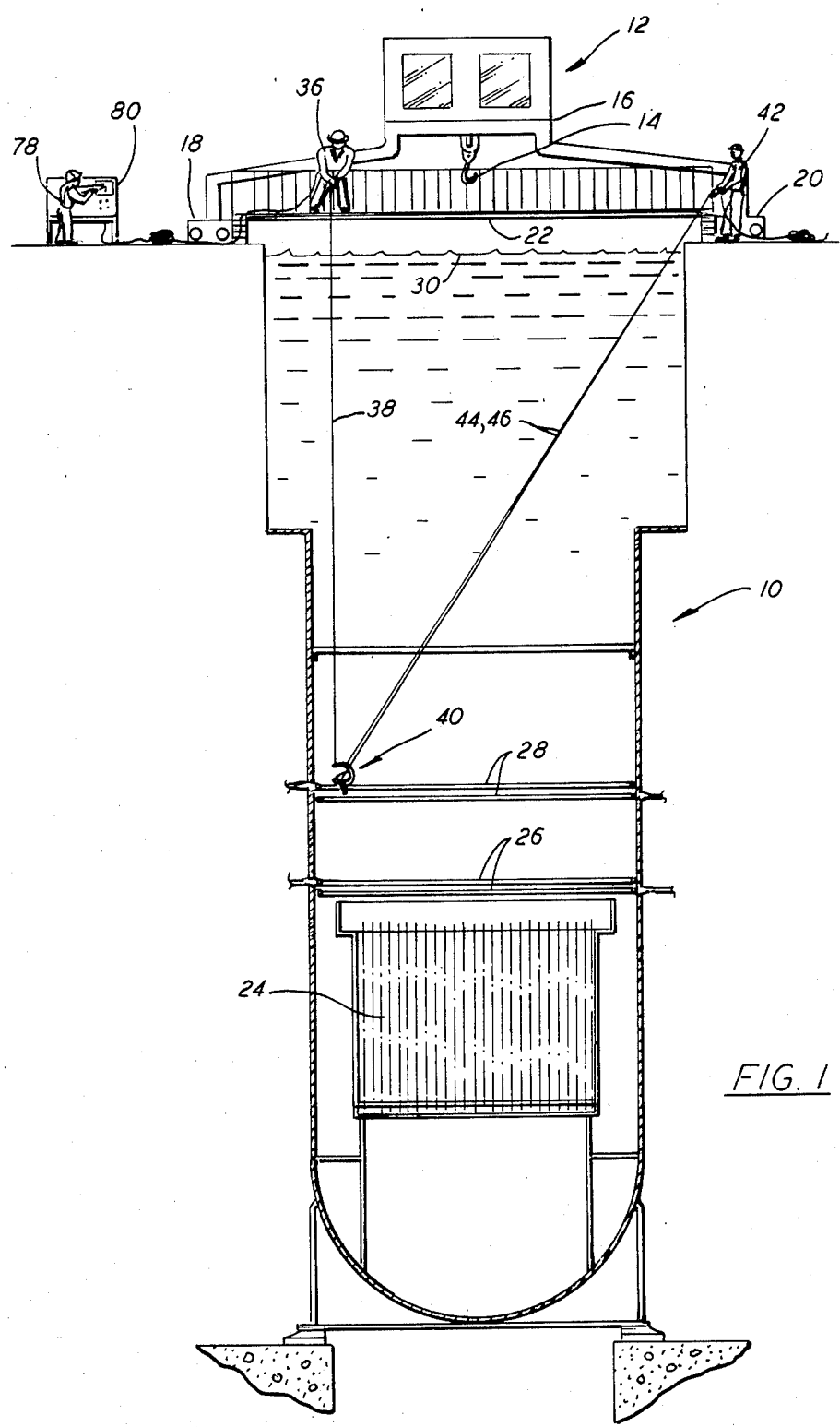
FIG. 1 is an elevational view in vertical section of a typic nuclear reactor vessel showing an inspection thereof according to the present invention in progress.
Figure 2:
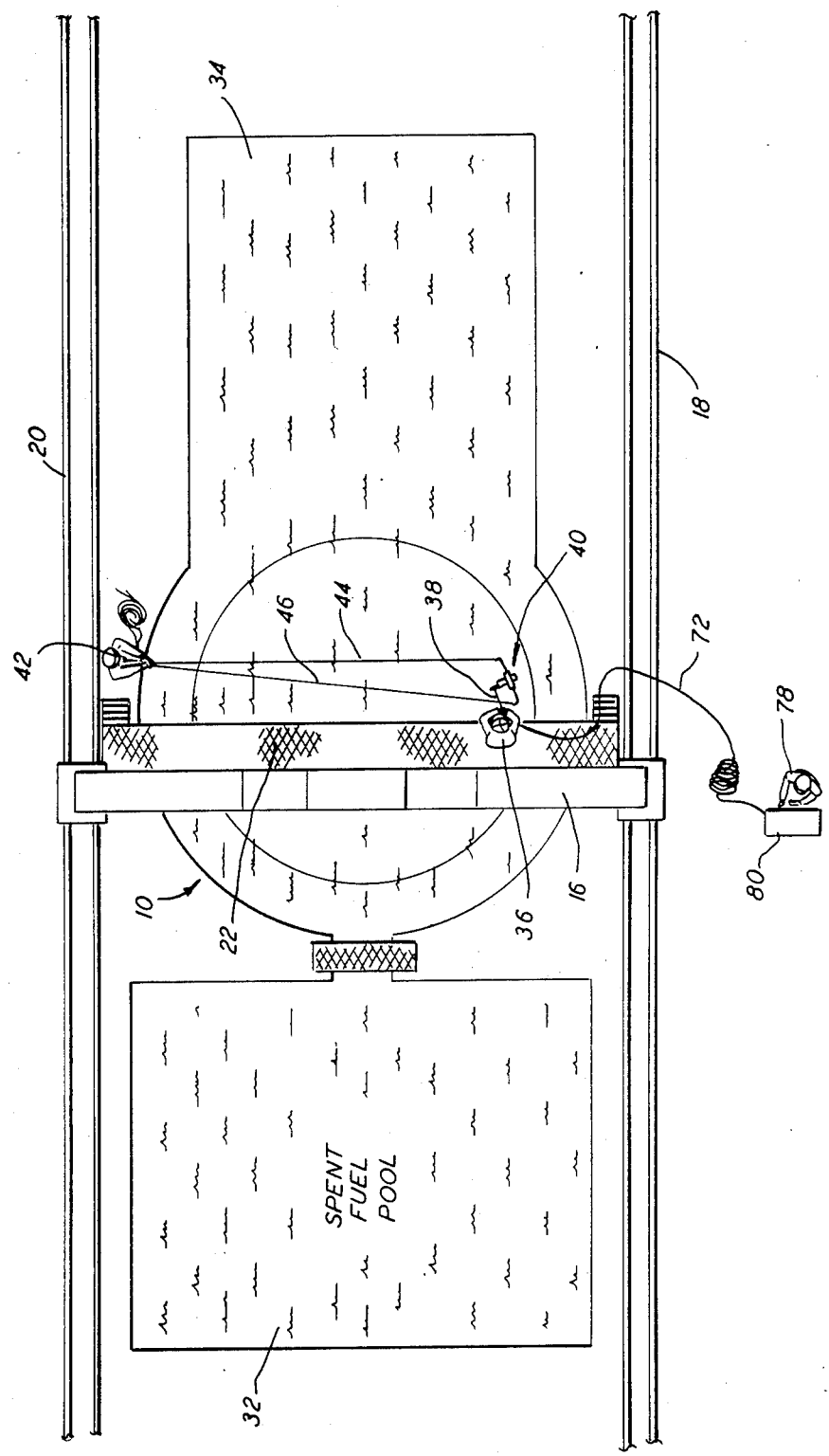
FIG. 2 is a plan view of the reactor vessel and inspection system of FIG. 1.

Referring now to the drawings, in FIGS. 1 and 2 is shown a typical nuclear reactor vessel, denoted generally by reference numeral 10, the usual gantry system 12, including vertically movable hook 14 carried on superstructure 16 which is horizontally movable on tracks 18 and 20, on opposite sides of the upper end of vessel 10. Platform or walk-way 22 is also carried upon and movable along tracks 18 and 20, together with gantry system 12. Interior details of vessel 10 are shown only very generally, including fuel cells 24 near the bottom of the reactor vessel, core spray spargers 26 and feed water spargers 28, all conventional elements in typical nuclear reactor systems currently in use. Vessel 10 is filled with water to the level indicated at 30.

As shown in FIG. 2, vessel 10 communicates on one side with spent fuel pool 32 and on the other side with equipment service pool 34, also in conventional manner. When in operation, a domeshaped cover is bolted to the top of vessel 10 which in turn is surrounded by a concentric thermal insulator, and concrete blocks are placed over the insulator at floor level. In order to inspect the internal components of vessel 10, the concrete blocks, thermal insulator and cover are removed and the steam dryer and shroud head with moisture separators welded thereto are lifted by gantry system 12 and carried into equipment service pool 34 wherein they are temporarily deposited during the inspection operations. Again, such apparatus and procedures are conventional in current reactor systems.

The inspection methods and apparatus of the present invention are employed with the reactor open and prepared as described above, while remaining filled with water. A first operator, indicated in FIGS. 1 and 2 by reference numeral 36, is positioned on walk-way 22 and holds line 38 from which inspection apparatus indicated generally by numeral 40 is suspended below the water level. A second operator indicated by reference numeral 42 is positioned on the floor surrounding the upper end of vessel 10 at some distance, and generally on the opposite side of the vessel, from the first operator. Second operator 42 holds a pair of lines 44 and 46 for manual manipulation in a manner which will later become apparent.

Figure 3:
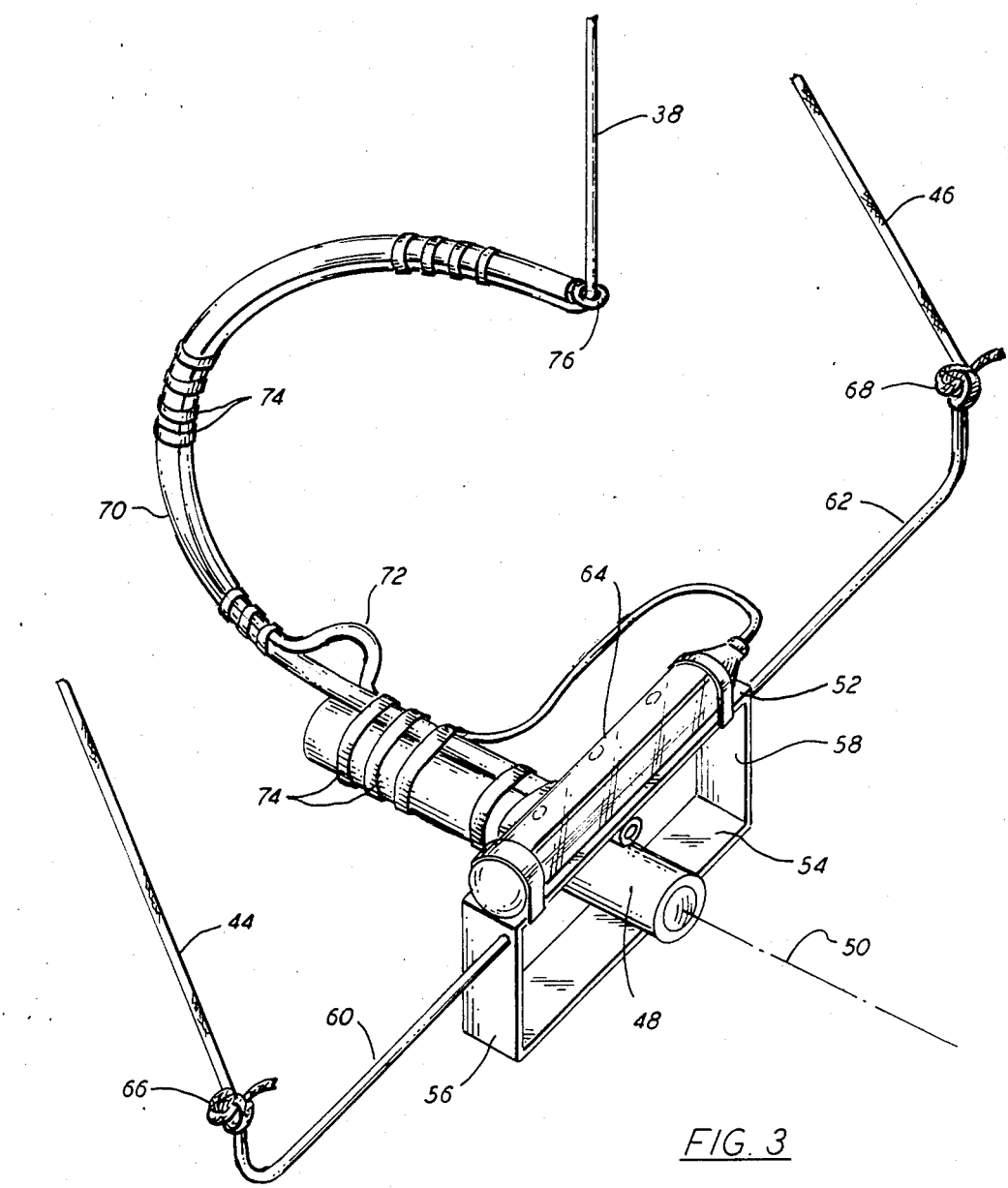
FIG. 3 is a perspective view of the positioning device used in the inspection system, with a television camera and lamp mounted thereon.

Turning now to FIG. 3, inspection apparatus 40 is shown in greater detail. Conventional video camera 48, adapted for underwater operation and having an optical axis indicated by line 50, is supported with its forward end extending through an open rectangular structure, preferably of welded stainless steel construction, having upper and lower members 52 and 54, respectively, and side members 56 and 58. Cameras of the type typically employed in such applications are commercially available in sizes, for example, of about 14 inches in length and 1⅜ inches in diameter. Arms 60 and 62 extend laterally outward from side members 56 and 58, respectively, of the rectangular structure and lamp 64 is mounted upon top member 52 thereof. End portions of arms 60 and 62 are bent upwardly and eyelets 66 and 68 are attached to the ends thereof.

Curved member 70 is fixedly attached, e.g., by welding to the lower surface of top member 52. Camera 48 and electircal cable 72 are secured to member 70 by straps 74 which may, for example, be adhesive tape, elastic bands, or the like. The cable may provide the necessary power connections to both camera 48 and lamp 64, as well as carrying the video signals from the camera to a remote display screen. Cable 72 is led through eyelet 76 on the upper end of member 70 and may be utilized to provide cable 38 by which apparatus 40 is suspended, as shown, or a separate line may be provided. In any case, the upper end of curbed member 70 is positioned substantially directly above the center of gravity of the elements supported at the lower end thereof so that the elements are balanced about the point at which tey are supported by cable 38. Lines 44 and 46 are attached to eyelets 66 and 68, respectively, and extend upwardly therefrom to operator 42 in a direction rearwardly to that in which camera 48 is directed.

Referring again to FIGS. 1 and 2, a third operator, indicated by reference numeral 78 is positioned to one side of the upper end of vessel 10 in front of equipment 80 which includes a CRT for viewing video images transmitted by camera 48 and a manual intensity control knob for selectively adjusting the brightness of lamp 64. Thus, apparatus 40 is lowered into vessel by first operator 36 paying out line 38 until camera 48 is at the desired depth. Walk-way 22 is, of course, positioned so that operator 36 is directly above the area being inspected at any given time. Second operator 42 rotates aparatus 40 by manipulation of lines 44 and 46 to position camera axis 50 in the desired orientation. Third operator 74 views the image on the CRT transmitted from camera 48 and gives continuing instructions for its deployment to the first and second operators, as well as controlling lamp intensity to provide the desired image brightness. In some applications, it is desireable to mount lamps both above and below the camera, in which case separate intensity controls would be provided for each lamp. Suitable lamps would comprise 10,000 watt quartz-halogen, for example, with intensity control provided by 15 amp variacs. Apparatus 40 is moved about the interior of vessel 10 in this manner until all desired portions thereof have been visually inspected by the third operator. Such inspections are simple, efficient and economical as compared with techniques which have been employed in the past involving the permanent installation of cameras and electrically operated positioning apparatus within the nuclear reactor vessels. Portions of typical reactors which would normally be inspected by the techniques of the present invention include feed water spargers, core spray spargers and the supply piping therefor, and various welded attachments as well as the stainless steel internal cladding of the vessel.

What is claimed is:

1. A system for visually inspecting water-immersed portions of the interior of a nuclear reactor vessel, said system comprising:
   (a) a television camera having an axis adapted to transmit video signals from underwater locations;
   (b) a first line by which said camera is suspended within said reactor vessel at a desired depth by selective manipulation of said first line from a first position above and outside said vessel;
   (c) second and third lines extending from a second position, above and outside said vessel and spaced from said first position, to secured ends on opposite sides of said camera and spaced laterally outward from said axis, whereby said camera may be rotationally oriented by selective manipulation of said second and third lines; and
   (d) a television monitor having a viewing screen at a third location, spaced from said first and second locations, and connected by an electrical cable to said camera to display images transmitted by said camera from inside said vessel.

2. The invention according to claim 1 wherein said first line comprises said electrical cable.

3. The invention according to claim 1 wherein said first location is on a walk-way extending across and above the upper end of said vessel.

4. The invention according to claim 3 wherein said second position is at substantially the level of and laterally adjacent the upper end of said vessel.

5. The invention according to claim 1 and further comprising mounting means to which said camera is secured, said first, second and third lines being secured to first, second and third portions, respectively, of said mounting means.

6. The invention according to claim 5 and further comprising lighting means supported on said mounting means to direct light forwardly of said camera generally along said axis 7. The invention according to claim 6 wherein said mounting means comprises a pair of arms extending outwardly on opposite sides of said axis and having end portions providing said mounting means second and third portions.

8. The invention according to claim 7 wherein said second and third portions are substantially equally spaced from said axis.

9. The invention according to claim 8 wherein said camera is generally elongated along said axis thereof and said mounting means comprises a member to which said camera is secured and extending to a terminal end providing said mounting means third portion.

10. The invention according to claim 9 wherein said pair of arms extend along a second axis substantially perpendicular to said camera axis, and said terminal end lies on a third axis substantially mutually perpendicular to said camera axis and said second axis.

11. The invention according to claim 10 wherein said lighting means comprises a lamp generally elongated in a direction parallel to said second axis.

12. A method of visually inspecting internal, water-submerged portions of a nuclear reactor vessel by means of a television camera monitor, said method comprising:

(a) opening the top of said vessel to permit access to the interior thereof from above;

(b) attaching a first line to structure above the axis of the camera;

(c) attaching second and third lines to structure spaced laterally outward of the camera axis on opposite sides thereof;

(d) positioning a first operator at a first location on a walk-way directly above the open top of said vessel and lowering the camera into said vessel to a desired depth by manual manipulation of said first line by said first operator;

(e) positioning a second operator at a second location spaced from said first location and laterally adjacent the open top of said vessel and orienting said camera axis by manual manipulation of said second and third lines;

(f) positioning a third operator at a third location spaced from said first and second locations for viewing an image on said television monitor transmitted by said camera; and (g) said third operator giving verbal instructions to said first and second operators to guide the position of said camera to provide viewing and inspection by said third operator of all desired internal portions of said vessels.

13. The invention according to claim 12 wherein said second and third lines extend generally upwardly and rearwardly with respect to the direction of orientation of said camera axis.

14. The invention according to claim 13 wherein said structure to which said first, second and third lines are attached comprises mounting means to which said camera is secured in fixed relation.

15. The invention according to claim 14 and further comprising mounting lighting means upon said mounting means to direct light forwardly of said camera.

16. The invention according to claim 15 and further comprising intensity control means for said lighting means operable by said third operator.

17. Apparatus for supporting a television camera in a submerged location within a nuclear reactor vessel for selective manipulation from above, said apparatus comprising:

(a) an elongated mounting member extending from a first end along a straight axis for a portion of its length to which said camera is secured to a second end on a line substantially perpendicular to said straight axis;

(b) a pair of arms extending laterally outward in opposite directions from said mounting member along a common axis substantially mutually perpendicular to said straight axis and said line to terminal ends at substantially equal distances from said straight axis; and (c) means on said second end of said mounting member for attaching a first line thereto, and on said terminal ends of said arms for attaching second and third lines thereto.

18. The invention according to claim 17 and further including an additional mounting member having a closed outline surrounding an opening, said first end of said elongated member being fixedly attached to a first portion of said additional member, whereby a camera secured to said portion of said elongated member extends through said opening, and said arms are fixedly attached to second and third portions of said additional member on each side of said first portion thereof.

* * * * *